April 13, 1965     D. L. HAM ETAL     3,177,711
TURBINE FLOWMETER
Filed Sept. 8, 1961
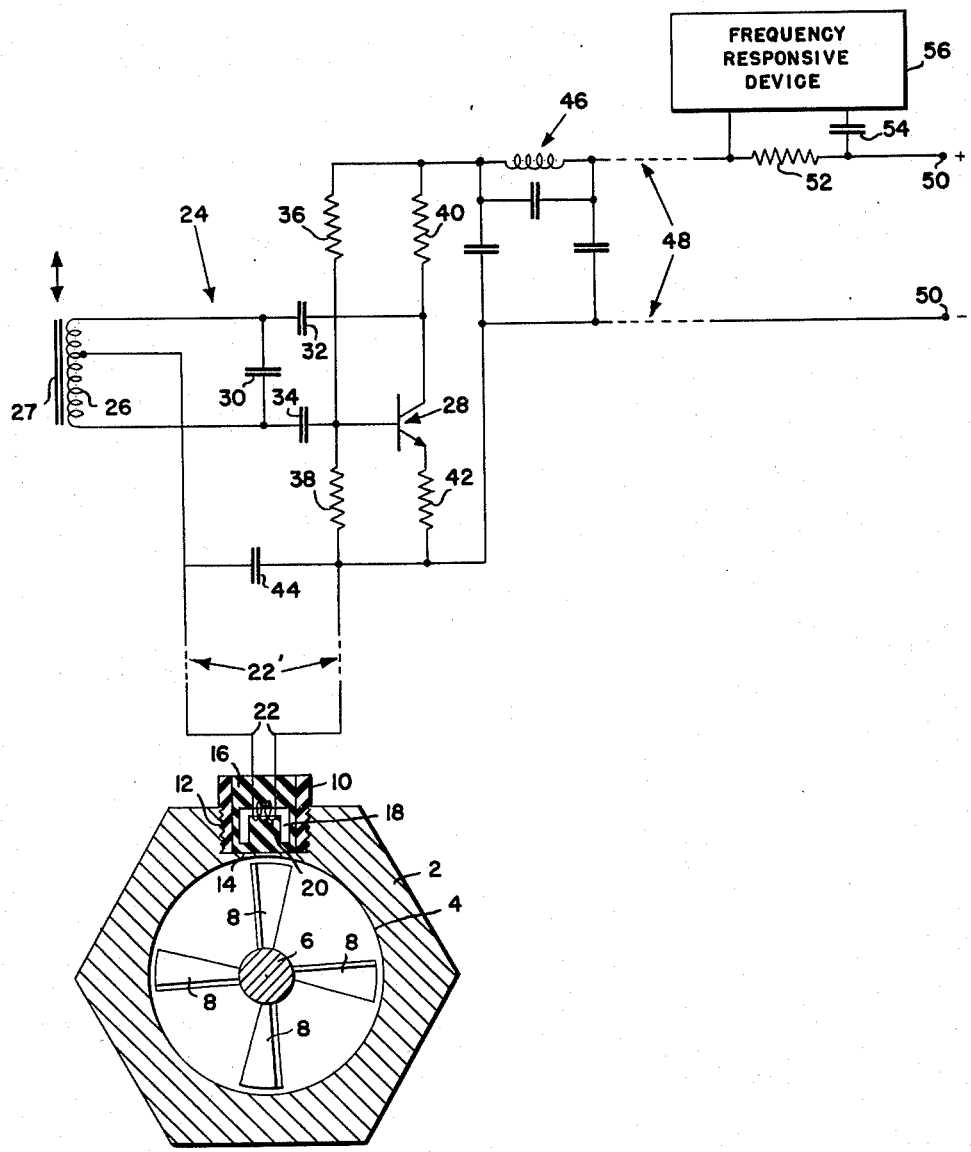
INVENTORS
DONALD L. HAM
ROY F. SCHMOOCK &
BY    HARRIS SHAFFER
ATTORNEYS

3,177,711
TURBINE FLOWMETER
Donald L. Ham and Roy F. Schmoock, Northampton, and Harris Shaffer, Abington, Pa., assignors to Fischer & Porter Company, Warminster, Pa., a corporation of Pennsylvania
Filed Sept. 8, 1961, Ser. No. 136,934
1 Claim. (Cl. 73—231)

This invention relates to turbine flowmeters and has particular reference to the provision of flowmeters capable of giving accurate flow indications at low flow rates within the range of operation.

Turbine flowmeters comprise passages within which are located runners provided with vanes so as to rotate, theoretically, at rates substantially proportional to flow. Such runners are mounted in anti-friction bearings to achieve accuracy. It has been customary to provide vanes either of magnetic material or, if of non-magnetic material, with inserts of magnetic material, in association with a radially directed core in the form of a permanent magnet carrying a winding so that as a change of magnetic field is produced as the vanes rotate in the vicinity of the magnetic core pulses are produced in the windings which may be fed to a pulse counter for integration of flow or to a device which provides an output signal proportional to frequency to give a measure of flow rate.

While such devices are satisfactory when flow rates are in excess of some low value in the range of operation, the drag on the runner occasioned by the magnetic field produces inaccurate results at low flow rates in the range. The drag in such meters is unavoidable if reasonably large output signals are to be produced and not subjected to excessive amplification, since the magnitude of the signal produced is a function of the runner speed and unless the magnetic field is strong only low amplitude signals will be produced at low flow rates. This situation of excessive drag exists particularly when high pressures are involved since then the walls of the passage must be continuous and, at the minimum, of substantial thickness, producing an unavoidable gap in the magnetic field.

The general object of the present invention is to provide a turbine flowmeter giving rise, as heretofore, to pulses produced by the passage of the vanes past a fixed point, but without the drag heretofore existing so that the linearity of the frequency-flow relationship may be maintained for relatively low flow rates. In accordance with the invention this object is achieved by having the vanes modulate the operation of an oscillator to produce fluctuations in a direct current supply circuit. In the adoption of this principle a simple single transistor oscillator may be used and, in particular, large output signals may be produced. The circuit in its preferred form avoids the modulation (in the usual sense) of a high frequency carrier which would necessitate the use of a separate detector stage to provide demodulation for recovery of the modulating signal.

The foregoing object, together with others relating to details of the meter, will become apparent from the following description, read in conjunction with the accompanying drawing, in which the figure is a diagram illustrating a preferred embodiment of the invention.

The meter comprises a conduit 2 providing a fluid passage 4 within which is coaxially mounted for free rotation a runner comprising a hub 6 and vanes 8. This arrangement of the conduit and runner is conventional and need not be described in detail.

The conduit, at least in the region where pickup of signals is to take place is desirably, if of metal, made of non-magnetic stainless steel, although, as will be evident, it may consist of plastic, Fiberglas, or the like. The use of non-magnetic stainless steel not only avoids "short-circuiting" of a magnetic field, but also provides high resistivity in the electro-magnetic field having advantages as described more fully below. It will become obvious that other metals than non-magnetic stainless steel may be used if they have generally similar properties.

A tubular insert 10, desirably of an insulating material, is tapped into an opening 12 in the conduit 2 leaving at 14 a thin wall of the conduit. The thickness of the wall which remains at 14 is dependent upon the pressures which are involved within the passage 4. The wall thickness which is left obviously depends, for a particular strength resistant to internal pressures, upon the diameter of the opening 12. If this is of small diameter, the wall thickness at 14 may be small, and in a practical example, the wall thickness may be of the order of thirty-thousandths of an inch thick. As will appear, despite this substantial thickness, proper action is achieved in accordance with this invention. In the drawing the diameter of the opening 12 is considerably exaggerated with respect to the diameter of the passage for clarity in showing the pickup parts.

Within the tube 10 there is potted in insulation 16 a C-shaped ferrite core 18 carrying a winding 20 from which there extends the leads 22. An advantage of the present invention is that the leads 22 passing to the oscillator about to be described may be quite long, as indicated by the dotted portions at 22', so that the detector may be quite remote from the other parts of the apparatus.

An oscillator is provided at 24 which may typically operate at a nominal frequency of 75 kilocycles per second, though the frequency is not important. It is, however, desirably high, to reduce the necessary sizes of the electrical parameters used, but in any event should be considerably higher than the highest signal frequency produced by the passage of the vanes 8 past the pickup.

The oscillator 24 is of generally conventional Hartley type, comprising the tank coil 26 wound about an axially adjustable ferrite or similar core 27, the adjustment of which is convenient for tuning purposes, permitting other elements of the circuit to be fixed. The tank circuit of the oscillator is completed by the capacitor 30 in parallel with the coil 26. A single transistor 28 is used in the circuit having its collector connected to the upper end of the coil 26 through a blocking capacitor 32, and its base connected to the lower end of the coil 26 through a blocking capacitor 34. For the provision of proper direct voltage to the transistor base a voltage divider is provided by the resistors 36 and 38. Suitable series resistors 40 and 42 are located in the supply leads respectively to the collector and emitter.

A capacitor 44 shunts the pickup winding 20, and serves (along with distributed capacity) to tune it to approximate resonance either when a vane 8 is closely adjacent to the pickup assembly or, alternatively, when the vanes are spaced therefrom. Instead of actually tuning this last-mentioned circuit it is more convenient to adjust the frequency of oscillation by variation of the position of the core 27 of the tank coil 26 after an installation is made. While parameters are prechosen to approximate the desired conditions just indicated at some nominal oscillator frequency, final adjustment is most conveniently made by observing the magnitude of the output signals.

A filter 46 which may be of any conventional type, but which is desirably of the form indicated, having shunt capacitors and a series tuned circuit, consisting of a coil in parallel with a fixed capacitor, is interposed between the connections (through resistors 40 and 42) to the collector and emitter of the transistor 28, the connections running through the pair of lines 48 to the direct current supply terminals 50. As indicated by the dotted lines, the connections at 48 may be long if desired. A resistor 52 is provided in one of the lines between the supply terminals and the filter, and the desired signals are taken across this resistor (with interposition of a blocking capacitor 54, if required) and delivered to the frequency-responsive device 56 which may be of any conventional type, consisting of a counter if the flow is to be integrated, or a frequency meter if the flow rate is to be indicated or recorded, or both such devices. Since these device may be of any conventional types such as heretofore used in conjunction with turbine flow-meters their particular forms need not be described. It may be noted that for operation of such devices frequency alone is of interest, amplitude being of no basic significance so long at it is adequate to produce operation of the device 56.

The operation of the meter is as follows:

The parameters of the oscillator are so chosen, in well-known fashion, to provide, desirably, class C operation. As is well known, this entails dependence of the direct current supply on the strength of the high frequency oscillations which are produced. Accordingly, if the magnitude of the oscillations is modulated, the direct current supplied to the oscillator is correspondingly modulated, fluctuating in accordance with the changes in magnitude of the oscillations. In accordance with the invention this modulation of the direct current supply is produced by varying the feedback in the oscillator. While the frequency of this modulation alone is of interest, and not its magnitude, it may be remarked that it is generally desirable to provide to supply terminals 50 a direct potential which is regulated, as by a Zener diode, to prevent spurious fluctuations. Typically, the voltage thus supplied may be about 27 volts with delivery of an average current of about five milliamperes when using an RT5204 transistor at 28. Of course, if other transistors are used, suitable voltages and currents for their operation may be provided.

The modulation of the magnitude of the oscillations produced is effected by the passage of the vanes 8 past the pickup core 18. In accordance with the invention, the vanes 8 may be of magnetic material such as magnetic stainless steel, the use of stainless steel being usually desirable to minimize corrosion. However, the vanes 8 need not be of magnetic material but may be of non-magnetic material such as a non-magnetic stainless steel, or other metal. So long as they are either magnetic or conductive there will occur as the vanes pass the pickup a change of inductance of the winding 20. As previously remarked, the winding 20 is shunted by the capacitor 44 to provide a tuning with resonance desirably either when a vane is adjacent to the pickup unit or remote therefrom. In either case, a highly variable reactance is provided in the feedback connection to the tap of the coil 26, and the magnitude of the oscillations is modulated at a frequency directly proportional to the frequency of passage of the vanes 8 past the pickup unit. The relationship of this frequency to flow rate depends, of course, on the number of vanes provided on the runner and the particular constant of the turbine meter.

The filter 46 is provided to block, at least to a major extent, the high frequency components, while at the same time passing direct current and the low frequency modulation corresponding to the passage of the vanes. The ultimate signals passing to, and utilized by, the frequency-responsive device 56 are at the modulating frequency.

It will be evident that there is not involved in this arrangement the low frequency modulation, in the usual sense, of a high frequency carrier which would ordinarily require a special demodulator. The modulation is due to the fluctuations in the direct current due to the class C operation corresponding to the variations in magnitude of the oscillations produced; and while the operation may be looked upon as involving the modulation of a high frequency carrier, with demodulation effected by the class C operation of the oscillator transistor, the modulated carrier is not separately produced and then demodulated. Thus, the whole operation may be made dependent upon the use of a single transistor, with consequent simplicity and reliability as well as the attainment of large output signals.

The attainment of the main object of the invention will now be apparent. There is no necessity for using a magnet either as a pickup core or, in multiple form, as either the vanes 8 or inserts therein. The operation described of varying the inductance of the winding 20 is accompanied by no perceptible drag on the turbine runner, the high frequency magnetic field being of negligible magnitude. Consequently, very low flow rates in the range of operation may be accurately measured by reason of their linear relationship to the frequency of the signals ultimately produced. Their magnitude, furthermore, is independent of speed of the runner. The limitation on the minimum flow rate which may be measured is, then, solely due to bearing friction which may be kept very low. Consistent with this there may be produced output signals to the device 56 of quite large magnitude.

The presence of the wall 14 between the vanes and the pickup unit does not seriously affect the production of the inductance variations of the winding 20 which are utilized for operation. While a high conduction material for the wall 14 will produce some shielding effect, making the passage of the vanes less effective, if the material used has a high resistivity, as does, for example, stainless steel or various aluminum alloys, the wall thickness at 14 may be quite substantial and capable of withstanding high internal pressures in the passage 4. Of course, if a non-conductive material is used for the conduit this problem of shielding effect does not exist.

It will be clear that variations in details of construction and operation may be made without departing from the scope of the invention as defined in the following claim.

What is claimed is:

A turbine flowmeter comprising means providing a fluid passage, a vaned turbine runner therein rotatable by fluid flowing through said passage, a class C oscillator including a tuned circuit in its feedback circuit, said tuned circuit comprising an inductor located adjacent to the vanes of said turbine runner outside the peripheries of said vanes and a capacitor in parallel with said inductor, said tuned circuit tuned approximately to the frequency of oscillation of said class C oscillator, the amplitude of the feedback signal in said oscillator being dependent on the impedance of said tuned circuit and the amplitude of the oscillation of said oscillator being dependent on the amplitude of the feedback signal in said oscillator, means supplying direct current for the operation of said oscillator, and means responsive to the variation in direct current supplied to the oscillator due to the modulation of the amplitude of its oscillation by variation of the inductance of said inductor.

References Cited in the file of this patent

UNITED STATES PATENTS

| | | |
|---|---|---|
| 2,325,927 | Wilber | Aug. 3, 1943 |
| 3,101,615 | Pavone | Aug. 27, 1963 |

FOREIGN PATENTS

| | | |
|---|---|---|
| 1,132,326 | France | Oct. 29, 1956 |

OTHER REFERENCES

"Electronics" (Brown, T. B.), published by John Wiley and Sons, New York, 1954, pages 333, 334, 533, and 534 relied upon.